US010133421B2

(12) United States Patent
Shepelev

(10) Patent No.: US 10,133,421 B2
(45) Date of Patent: Nov. 20, 2018

(54) DISPLAY STACKUPS FOR MATRIX SENSOR

(71) Applicant: Synaptics Incorporated, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 144 days.

(21) Appl. No.: 14/674,037

(22) Filed: Mar. 31, 2015

(65) Prior Publication Data

US 2015/0286317 A1 Oct. 8, 2015

Related U.S. Application Data

(60) Provisional application No. 61/973,937, filed on Apr. 2, 2014.

(51) Int. Cl.

*G06F 3/045* (2006.01)
*G06F 3/044* (2006.01)
*G06F 3/041* (2006.01)

(52) U.S. Cl.

CPC ............ *G06F 3/044* (2013.01); *G06F 3/0412* (2013.01); *G06F 3/0416* (2013.01)

(58) Field of Classification Search

CPC ...... G06F 3/044; G06F 3/0416; G06F 3/0412; G06F 2203/04111

See application file for complete search history.

(56) References Cited

U.S. PATENT DOCUMENTS

| | | | |
|---|---|---|---|
| 4,087,625 | A | 5/1978 | Dym et al. |
| 4,233,522 | A | 11/1980 | Grummer et al. |
| 4,237,421 | A | 12/1980 | Waldron |
| 4,264,903 | A | 4/1981 | Bigelow |

(Continued)

FOREIGN PATENT DOCUMENTS

| | | |
|---|---|---|
| CN | 2436978 Y | 6/2001 |
| CN | 1490713 A | 4/2004 |

(Continued)

OTHER PUBLICATIONS

Quantum Research Group. “Qmatrix Technology White Paper”, 2006. 4 Pages.

(Continued)

*Primary Examiner* — Srilakshmi K Kumar
*Assistant Examiner* — Brent D Castiaux
(74) *Attorney, Agent, or Firm* — Patterson + Sheridan, LLP

(57) ABSTRACT

Capacitive sensing devices that provide short settling time and fast response without creating undesirable visual effects are disclosed herein. In one embodiment, the capacitive sensing device includes a pixel layer stacked with a conductive sensor layer and a metal interconnect layer. The conductive sensor layer has a plurality of sensor electrodes, each of which includes one or more common electrodes. The plurality of sensor electrodes has an areal extent in which an active area of the sensor electrodes is configured to detect input events. The metal interconnect layer is disposed in the active area and includes routing traces. The routing traces are coupled to the plurality of sensor electrodes and extend from within a first region defined by the areal extent of the plurality of sensor electrodes to a second region outward of the areal extent of the plurality of sensor electrodes.

20 Claims, 8 Drawing Sheets

100
160
140
110
PROCESSING SYSTEM
120
130
130

(56) References Cited

U.S. PATENT DOCUMENTS 4,293,987 A 10/1981 Gottbreht et al.
4,484,026 A 11/1984 Thornburg
4,492,958 A 1/1985 Minami
4,550,221 A 10/1985 Mabusth
4,659,874 A 4/1987 Landmeier
4,667,259 A 5/1987 Uchida et al.
4,677,259 A 6/1987 Abe
4,705,919 A 11/1987 Dhawan
4,771,138 A 9/1988 Dhawan
4,878,013 A 10/1989 Andermo
4,954,823 A 9/1990 Binstead
4,999,462 A 3/1991 Purcell
5,053,715 A 10/1991 Andermo
5,062,916 A 11/1991 Aufderheide et al.
5,239,307 A 8/1993 Andermo
5,341,233 A 8/1994 Tomoike et al.
5,459,463 A 10/1995 Gruaz et al.
5,463,388 A 10/1995 Boie et al.
5,650,597 A 7/1997 Redmayne
5,657,012 A 8/1997 Tait
5,777,596 A 7/1998 Herbert
5,841,078 A 11/1998 Miller et al.
5,869,790 A 2/1999 Shigetaka et al.
6,188,391 B1 2/2001 Seely et al.
6,222,522 B1 4/2001 Mathews et al.
6,256,022 B1 7/2001 Manaresi et al.
6,281,888 B1 8/2001 Hoffman et al.
6,288,707 B1 9/2001 Philipp
6,297,811 B1 10/2001 Kent et al.
6,307,751 B1 10/2001 Bodony et al.
6,320,394 B1 11/2001 Tartagni
6,362,633 B1 3/2002 Tartagni
6,380,930 B1 4/2002 Van Ruymbeke
6,452,514 B1 9/2002 Philipp
6,459,044 B2 10/2002 Watanabe et al.
6,486,862 B1 11/2002 Jacobsen et al.
6,512,381 B2 1/2003 Kramer
6,535,200 B2 3/2003 Philipp
6,583,632 B2 6/2003 Von Basse et al.
6,653,736 B2 11/2003 Kishimoto et al.
6,731,120 B2 5/2004 Tartagni
6,771,327 B2 8/2004 Sekiguchi
6,825,833 B2 11/2004 Mulligan et al.
6,879,930 B2 4/2005 Sinclair et al.
6,910,634 B1 6/2005 Inose et al.
6,929,001 B2 8/2005 Yoon
6,937,031 B2 8/2005 Yoshioka et al.
6,998,855 B2 2/2006 Tartagni
7,129,935 B2 10/2006 Mackey
7,158,125 B2 1/2007 Sinclair et al.
7,218,314 B2 5/2007 Itoh
7,288,946 B2 10/2007 Hargreaves et al.
7,306,144 B2 12/2007 Moore
7,327,352 B2 2/2008 Keefer et al.
7,339,579 B2 3/2008 Richter et al.
7,348,967 B2 3/2008 Zadesky et al.
7,382,139 B2 6/2008 Mackey
7,388,571 B2 6/2008 Lowles et al.
7,423,219 B2 9/2008 Kawaguchi et al.
7,423,635 B2 9/2008 Taylor et al.
7,439,962 B2 10/2008 Reynolds et al.
7,455,529 B2 11/2008 Fujii et al.
7,522,230 B2 4/2009 Lee
7,548,073 B2 6/2009 Mackey et al.
7,554,531 B2 6/2009 Baker et al.
7,589,713 B2 9/2009 Sato
7,663,607 B2 2/2010 Hotelling et al.
7,724,243 B2 5/2010 Geaghan
7,768,273 B1 8/2010 Kalnitsky et al.
7,786,981 B2 8/2010 Proctor
7,808,255 B2 10/2010 Hristov et al.
7,812,825 B2 10/2010 Sinclair et al.
7,821,274 B2 10/2010 Philipp et al.
7,821,502 B2 10/2010 Hristov
7,864,160 B2 1/2011 Geaghan et al.
7,876,309 B2 1/2011 XiaoPing
7,973,771 B2 7/2011 Geaghan
7,977,953 B2 7/2011 Lee
7,986,152 B2 7/2011 Philipp et al.
8,040,326 B2 10/2011 Hotelling et al.
8,059,015 B2 11/2011 Hua et al.
8,125,463 B2 2/2012 Hotelling et al.
8,243,027 B2 8/2012 Hotelling et al.
8,259,078 B2 9/2012 Hotelling et al.
8,278,571 B2 10/2012 Orsley
8,319,747 B2 11/2012 Hotelling et al.
8,599,150 B2 12/2013 Phillip
8,653,834 B2 2/2014 Reynolds
2002/0077313 A1 6/2002 Clayman
2003/0052867 A1 3/2003 Shigetaka et al.
2003/0103043 A1 6/2003 Mulligan et al.
2003/0215976 A1 11/2003 Chou et al.
2003/0234771 A1 12/2003 Mulligan et al.
2004/0062012 A1 4/2004 Murohara
2004/0077313 A1 4/2004 Oba et al.
2004/0125087 A1 7/2004 Taylor et al.
2004/0222974 A1 11/2004 Hong et al.
2004/0239650 A1 12/2004 Mackey
2004/0252109 A1 12/2004 Trent et al.
2005/0030048 A1 2/2005 Bolender et al.
2006/0038754 A1 2/2006 Kim
2006/0097991 A1 5/2006 Hotelling et al.
2006/0114240 A1 6/2006 Lin
2006/0114241 A1 6/2006 Lin
2006/0232600 A1 10/2006 Kimura et al.
2007/0008299 A1 1/2007 Hristov
2007/0222762 A1 9/2007 Van Delden et al.
2007/0229466 A1 10/2007 Peng et al.
2007/0229468 A1 10/2007 Peng et al.
2007/0229469 A1 10/2007 Seguine
2007/0229470 A1 10/2007 Snyder et al.
2007/0242054 A1 10/2007 Chang et al.
2007/0257894 A1 11/2007 Philipp
2007/0262962 A1 11/2007 XiaoPing et al.
2007/0262963 A1 11/2007 Xiao-Ping et al.
2007/0268265 A1 11/2007 XiaoPing
2007/0273659 A1 11/2007 XiaoPing et al.
2007/0273660 A1 11/2007 XiaoPing
2007/0279395 A1 12/2007 Philipp et al.
2007/0291009 A1 12/2007 Wright et al.
2008/0006453 A1 1/2008 Hotelling
2008/0007534 A1 1/2008 Peng et al.
2008/0007539 A1 1/2008 Hotelling
2008/0062140 A1* 3/2008 Hotelling ............ G09G 3/3648 345/173
2008/0074398 A1 3/2008 Wright
2008/0111795 A1 5/2008 Bollinger
2008/0117182 A1 5/2008 Um et al.
2008/0150906 A1 6/2008 Grivna
2008/0158172 A1 7/2008 Hotelling et al.
2008/0158181 A1 7/2008 Hamblin et al.
2008/0164076 A1* 7/2008 Orsley ............... G06F 3/03543 178/18.01
2008/0218488 A1 9/2008 Yang et al.
2008/0245582 A1 10/2008 Bytheway
2008/0259044 A1 10/2008 Utsunomiya et al.
2008/0264699 A1 10/2008 Chang et al.
2008/0265914 A1 10/2008 Matsushima
2008/0297176 A1 12/2008 Douglas
2008/0308323 A1 12/2008 Huang et al.
2008/0309634 A1 12/2008 Hotelling et al.
2008/0309635 A1 12/2008 Matsuo
2009/0002337 A1 1/2009 Chang
2009/0002338 A1 1/2009 Kinoshita et al.
2009/0040191 A1 2/2009 Tong et al.
2009/0046077 A1 2/2009 Tanaka et al.
2009/0091551 A1 4/2009 Hotelling et al.
2009/0096757 A1 4/2009 Hotelling et al.
2009/0107737 A1 4/2009 Reynolds et al.
2009/0128518 A1 5/2009 Kinoshita et al.
2009/0135151 A1 5/2009 Sun
2009/0153509 A1 6/2009 Jiang et al.
2009/0160682 A1 6/2009 Bolender et al.
2009/0185100 A1 7/2009 Matsuhira et al.

(56) References Cited

U.S. PATENT DOCUMENTS

| | | | |
|---|---|---|---|
| 2009/0194344 | A1 | 8/2009 | Harley et al. |
| 2009/0201267 | A1 | 8/2009 | Akimoto et al. |
| 2009/0207154 | A1 | 8/2009 | Chino |
| 2009/0213082 | A1 | 8/2009 | Ku |
| 2009/0213534 | A1 | 8/2009 | Sakai |
| 2009/0236151 | A1 | 9/2009 | Yeh et al. |
| 2009/0256821 | A1 | 10/2009 | Mamba et al. |
| 2009/0262096 | A1 | 10/2009 | Teramoto |
| 2009/0267916 | A1 | 10/2009 | Hotelling |
| 2009/0273571 | A1 | 11/2009 | Bowens |
| 2009/0273573 | A1 | 11/2009 | Hotelling |
| 2009/0277695 | A1 | 11/2009 | Liu et al. |
| 2009/0283340 | A1 | 11/2009 | Liu et al. |
| 2009/0303203 | A1 | 12/2009 | Yilmaz et al. |
| 2009/0309850 | A1 | 12/2009 | Yang |
| 2009/0314621 | A1 | 12/2009 | Hotelling |
| 2009/0324621 | A1 | 12/2009 | Senter et al. |
| 2010/0001966 | A1 | 1/2010 | Lii et al. |
| 2010/0006347 | A1 | 1/2010 | Yang |
| 2010/0013745 | A1 | 1/2010 | Kim et al. |
| 2010/0013800 | A1 | 1/2010 | Elias et al. |
| 2010/0020032 | A1 | 1/2010 | Mamba et al. |
| 2010/0044122 | A1 | 2/2010 | Sleeman et al. |
| 2010/0090979 | A1 | 4/2010 | Bae |
| 2010/0134422 | A1 | 6/2010 | Borras |
| 2010/0140359 | A1 | 6/2010 | Hamm et al. |
| 2010/0147600 | A1 | 6/2010 | Orsley |
| 2010/0149108 | A1 | 6/2010 | Hotelling et al. |
| 2010/0156839 | A1 | 6/2010 | Ellis |
| 2010/0163394 | A1 | 7/2010 | Tang et al. |
| 2010/0182273 | A1 | 7/2010 | Noguchi et al. |
| 2010/0188359 | A1 | 7/2010 | Lee |
| 2010/0214247 | A1 | 8/2010 | Tang et al. |
| 2010/0220075 | A1 | 9/2010 | Kuo et al. |
| 2010/0253646 | A1 | 10/2010 | Hiratsuka |
| 2010/0258360 | A1 | 10/2010 | Yilmaz |
| 2010/0265210 | A1 | 10/2010 | Nakanishi et al. |
| 2010/0265212 | A1 | 10/2010 | Sekiguchi et al. |
| 2010/0271330 | A1 | 10/2010 | Philipp |
| 2010/0277433 | A1 | 11/2010 | Lee et al. |
| 2010/0289770 | A1 | 11/2010 | Lee et al. |
| 2010/0291973 | A1 | 11/2010 | Nakahara et al. |
| 2010/0302201 | A1 | 12/2010 | Ritter et al. |
| 2010/0321043 | A1 | 12/2010 | Philipp et al. |
| 2010/0321326 | A1* | 12/2010 | Grunthaner ............. G06F 3/044 345/174 |
| 2011/0018841 | A1 | 1/2011 | Hristov |
| 2011/0022351 | A1 | 1/2011 | Philipp et al. |
| 2011/0025639 | A1 | 2/2011 | Trend et al. |
| 2011/0048812 | A1 | 3/2011 | Yilmaz |
| 2011/0048813 | A1 | 3/2011 | Yilmaz |
| 2011/0057887 | A1 | 3/2011 | Lin et al. |
| 2011/0062969 | A1 | 3/2011 | Hargreaves et al. |
| 2011/0062971 | A1 | 3/2011 | Badaye |
| 2011/0063251 | A1 | 3/2011 | Geaghan et al. |
| 2011/0080357 | A1 | 4/2011 | Park et al. |
| 2011/0090159 | A1 | 4/2011 | Kurashima |
| 2011/0096016 | A1 | 4/2011 | Yilmaz |
| 2011/0109579 | A1 | 5/2011 | Wang et al. |
| 2011/0109590 | A1 | 5/2011 | Park |
| 2011/0141051 | A1 | 6/2011 | Ryu |
| 2011/0169770 | A1 | 7/2011 | Mishina et al. |
| 2011/0187666 | A1 | 8/2011 | Min |
| 2011/0267300 | A1 | 11/2011 | Serban et al. |
| 2011/0273391 | A1 | 11/2011 | Bae |
| 2012/0044171 | A1 | 2/2012 | Lee et al. |
| 2012/0050216 | A1 | 3/2012 | Kremin et al. |
| 2012/0056820 | A1 | 3/2012 | Corbridge |
| 2012/0227259 | A1* | 9/2012 | Badaye ................... G06F 3/044 29/846 |
| 2012/0313901 | A1 | 12/2012 | Monson |
| 2013/0191804 | A1* | 7/2013 | Bytheway ........... G06F 17/5077 716/126 |

FOREIGN PATENT DOCUMENTS

| | | | |
|---|---|---|---|
| EP | 0810540 | A2 | 12/1997 |
| EP | 0919945 | A2 | 6/1999 |
| EP | 0977159 | A1 | 2/2000 |
| JP | 2002-215330 | A | 8/2002 |
| JP | 2002-268786 | A | 9/2002 |
| JP | 2002268768 | A | 9/2002 |
| JP | 2011002947 | A | 1/2011 |
| JP | 2011002948 | A | 1/2011 |
| JP | 2011002949 | A | 1/2011 |
| JP | 2011002950 | A | 1/2011 |
| JP | 2011004076 | A | 1/2011 |
| JP | 2011100379 | A | 5/2011 |
| KR | 10110118065 | | 1/2012 |
| WO | 86/06551 | A1 | 11/1986 |
| WO | 0057344 | A1 | 9/2000 |
| WO | 2010117946 | A2 | 10/2010 |
| WO | 20100136932 | A1 | 12/2010 |

OTHER PUBLICATIONS

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

Fujitsu Microelectronics Limited. "IC Package." (2002). 10 pages.

International Search Report, PCT/US2013/021314 dated Jun. 25, 2013.

* cited by examiner 230
312
314
316
250
240
308
310
304
242
306
TO 110

DISPLAY STACKUPS FOR MATRIX SENSOR

CROSS-REFERENCE TO RELATED APPLICATIONS

This application claims benefit of U.S. Provisional Patent Application Ser. No. 61/973,937, filed Apr. 2, 2014, which is incorporated by reference in its entirety.

BACKGROUND

Field

Embodiments of the present invention generally relate to electronic devices, and more specifically, to multi-layer capacitive sensing stacks.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in or peripheral to, notebook or desktop computers). Proximity sensor devices are also often used in smaller computing systems (such as touch screens integrated in cellular phones).

SUMMARY

Capacitive sensing devices that provide short settling time and fast response without creating undesirable visual effects are disclosed herein. In one embodiment, the capacitive sensing device includes a pixel layer stacked with a conductive sensor layer and a metal interconnect layer. The pixel layer includes pixel electrodes. The conductive sensor layer has a plurality of sensor electrodes. Each of the sensor electrodes includes one or more common electrodes. The plurality of sensor electrodes has an areal extent defined in a plane of the conductive sensor layer in which an active area of the sensor electrodes is configured to detect input events. The metal interconnect layer is disposed in the active area and stacked with the conductive sensor layer. The metal interconnect layer includes routing traces. The routing traces are coupled to the plurality of sensor electrodes and extend from within a first region defined by the areal extent of the plurality of sensor electrodes to a second region outward of the areal extent of the plurality of sensor electrodes.

In one embodiment, the capacitive sensing device includes a processing system and a display device. The display device has a sensing stack that includes a conductive sensor layer having a plurality of sensor electrodes arranged in a matrix, a metal interconnect layer, and a pixel layer having pixel electrodes. Each of the sensor electrodes includes one or more common electrodes. The plurality of sensor electrodes has an areal extent defined in a plane of the conductive sensor layer in which an active area of the sensor electrodes is configured to detect input events. The metal interconnect layer is fabricated from a material having a resistivity lower than a material comprising the conductive sensor layer. The metal interconnect layer includes routing traces coupled to the plurality of sensor electrodes. The routing traces extend from within a first region of the sensing stack defined by the areal extent of the plurality of sensor electrodes to a second region of the sensing stack defined outward of the areal extent of the plurality of sensor electrodes. The processing system is coupled to the plurality of sensor electrodes via the routing traces. The processing system is configured to drive sensing signals onto the routing traces for performing capacitive sensing.

In yet another embodiment, the capacitive sensing device includes a processing system and a display device having a sensing stack. The sensing stack includes a conductive sensor layer, routing traces, a black mask layer, a pixel layer having pixel electrodes, and a plurality of source lines. The conductive sensor layer has a plurality of sensor electrodes arranged in a matrix. Each of the sensor electrodes includes one or more common electrodes. The plurality of sensor electrodes is disposed in a first region of the sensing stack defined by an areal extent of the plurality of sensor electrodes. The routing traces formed from a material having a resistivity lower than a material comprising the conductive sensor layer. The routing traces are connected to the plurality of sensor electrodes in the first region and extend to a second region of the sensing stack defined outward of the areal extent of the plurality of sensor electrodes. The black mask layer covers the routing traces. At least one pair of adjacent pixel electrodes have routing traces disposed therebetween. The plurality of source lines are disposed in the first region and extend to a second region defined outward of the areal extent of the plurality of sensor electrodes. The source lines are covered by the black mask layer and stacked above or below the routing traces. The processing system is coupled to the plurality of sensor electrodes via the routing traces. The processing system is configured to drive sensing signals onto the routing traces for performing capacitive sensing.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
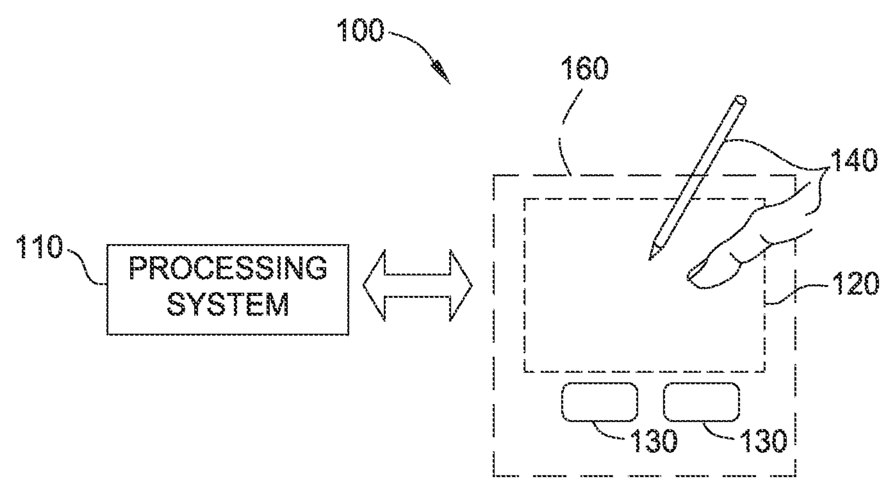
FIG. 1 is a block diagram of an exemplary system that includes an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention include a multi-layered sensing stack in an input device for performing capacitive sensing. In one example, the input device performs capacitive sensing using a matrix of sensor electrodes arranged in a common plane. The matrix of sensor electrodes may be integrated into a display device of the input device. Because the sensor electrodes comprising the matrix are spaced apart, traces coupled to each sensor electrode can be undesirably visible. Additionally, since larger input devices may include thousands of individual sensor electrodes, utilizing transparent conducting oxides such as indium tin oxide (ITO) to avoid visibility issues may be undesirable due to high resistivity and slow response times. In one solution, the traces utilized to route signals to and from the matrix of sensor electrodes are formed from a metal interconnect layer which may be masked or shielded from view. Traces formed from the metal interconnect layer have much lower resistivity compared to ITO traces, allowing the input devices described herein to enjoy faster response times and shorter settling times without creating undesirable visual effects.

In one embodiment, the input device includes a multi-layered sensing stack that includes a plurality of sensor electrodes arranged in a single plane. The sensor electrodes are spaced apart from a plurality of pixel electrodes, wherein the pixel electrodes are arranged in a plane parallel to the plane of the sensor electrodes. Routing traces, formed in a metal interconnect layer, are disposed in a plane separate from the plane of the metal interconnect layer and the plane of the sensor electrodes. The routing traces extend from within a first region defined by an areal extent of the plurality of sensor electrodes to a second region outward of the areal extent of the plurality of sensor electrodes. The routing traces are routed between the pixel electrodes. The routing traces may optionally be masked to further prevent undesired visual evidence of the presence of the traces.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
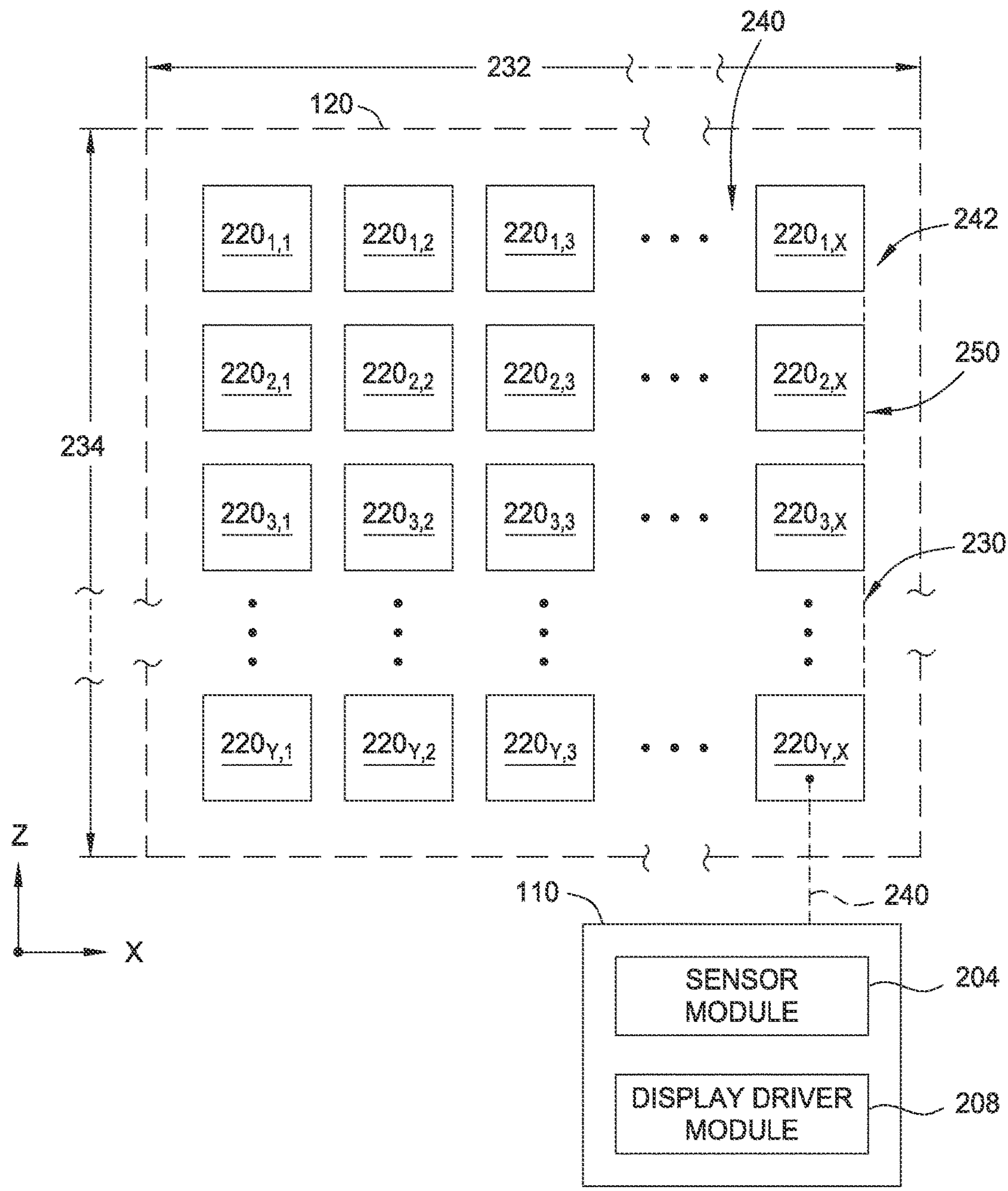
FIG. 2 is a schematic plan view of an exemplary pattern of sensor electrodes configured to sense in a sensing region.

FIG. 2 illustrates an exemplary pattern of sensor electrodes 220 configured to sense in the sensing region 120 associated with the pattern, according to some embodiments. For clarity of illustration and description, FIG. 2 shows the sensor electrodes 220 in a pattern of simple rectangles and does not show various other components. The exemplary pattern comprises a matrix 250 of sensor electrodes $\mathbf{220}_{X,Y}$ (referred collectively as sensor electrodes 220) arranged in X columns and Y rows in a single plane, wherein X and Y are positive integers, although one of X and Y may be zero. It is contemplated that the matrix 250 of sensor electrodes 220 may comprises a plurality of sensor electrodes 220 having other matrix configurations, such as rectangular arrays, polar arrays, repeating patterns, non-repeating patterns, non-uniform arrays, a single row or column, or other suitable planar arrangement of sensor electrodes. Further, the sensor electrodes 220 may be any shape such as circular, rectangular, diamond, star, square, noncovex, convex, non-concave concave, etc. The sensor electrodes 220 are coupled to the processing system 110 and utilized to determine the presence (or lack thereof) of an input object 140 in the sensing region 120.

In some capacitive sensing embodiments, one or more of the sensor electrodes 220 comprise one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the common electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 220 comprises one or more common electrodes. In other embodiments, at least two sensor electrodes 220 may share at least one common electrode.

The matrix 250 of sensor electrodes 220 are arranged in a single plane, for example, an X-Z plane as shown in FIG. 2. The matrix 250 has an areal extent 230, defined by a length 232 and a width 234 of the matrix 250 as measured from the outer edges of the outermost perimeter sensor electrodes 220.

Continuing to refer to FIG. 2, the processing system 110 is coupled to the sensor electrodes 220 utilizing routing traces 240, one of which is shown. The processing system 110 includes a sensor module 204 and optionally, a display driver module 208. In one embodiment the sensor module 204 comprises circuitry that drives a transmitter signal or a modulated signal onto, and receives resulting signals with, the sensor electrodes 220 during periods in which input sensing is desired. In one embodiment, the sensor module 204 includes a transmitter module including circuitry configured to drive a transmitter signal onto the sensor electrodes 220 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 120. The modulated signal used in absolute capacitive sensing may be the same or different from the transmitter signal used in transcapacitive sensing. The sensor module 204 may be selectively coupled to one or more of the sensor electrodes 220. For example, the sensor module 204 may be coupled to selected portions of the sensor electrodes 220 and operate in either an absolute or transcapacitive sensing mode. In another example, the sensor module 204 may be a different portion of the sensor electrodes 220 and operate in either an absolute or transcapacitive sensing mode. In yet another example, the sensor module 204 may be coupled to all the sensor electrodes 220 and operate in either an absolute or transcapacitive sensing mode.

In various embodiments the sensor module 204 may comprise a receiver module that includes circuitry configured to receive a resulting signal with the sensor electrodes 220 comprising effects corresponding to the transmitter signal during periods in which input sensing is desired. In one or more embodiments, the receiver module is configured to drive a modulated signal onto a sensor electrode 220 and receive a resulting signal corresponding to the modulated signal to determine changes in absolute capacitance of the sensor electrode 220. The receiver module may determine a position of the input object 140 in the sensing region 120 or may provide a signal including information indicative of the resulting signal to another module or processor, for example, determination module or a processor of the electronic device 150 (i.e., a host processor), for determining the position of the input object 140 in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a common electrode is driven for display updating, the common electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 220 for capacitive sensing during any one or more of or any combination of the different non-display update times.

The display driver module 208 includes circuitry confirmed to provide display image update information to the display of the display device 160 during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

As discussed above, the sensor electrodes 220 may be formed as discrete geometric forms, polygons, bars, pads, lines or other shape, which are ohmically isolated from one another. The sensor electrodes 220 may be electrically coupled through circuitry to form electrodes of having larger plan area relative to a discrete one of the sensor electrodes 220. The sensor electrodes 220 may be fabricated from opaque or non-opaque conductive materials. In embodiments wherein the sensor electrodes 220 are utilized with a display device, it may be desirable to utilize non-opaque conductive materials for the sensor electrodes 220. In embodiments wherein the sensor electrodes 220 are not utilized with a display device, it may be desirable to utilize opaque conductive materials having lower resistivity for the sensor electrodes 220 to improve sensor performance. Materials suitable for fabricating the sensor electrodes 220 include ITO, aluminum, silver, copper, and conductive carbon materials, among others. The sensor electrodes 220 may be formed as contiguous body of conductive material having little or no open area (i.e., having a planar surface uninterrupted by holes), or may alternatively be fabricated to form a body of material having openings formed therethrough. For example, the sensor electrodes 220 may be formed from a mesh of conductive material, such as a plurality of interconnected thin metal wires. In one embodiment, at least one of the length and width of the sensor electrodes 220 may be in a range of about 1 to about 10 mm. In other embodiments, at least one of the length and width of the sensor electrodes may be less than about 1 mm or greater than about 10 mm. In other embodiment, the length and width may not similar, and one of the length and width may be in the range of about 1 to about 2 mm. Further, on various embodiments, the sensor electrodes 220 may comprise a center to center pitch in the range of about 4 to about 20 mm; however, in other embodiments, the pitch may be less than about 4 mm or greater than about 20 mm. Further, in various embodiments the sensor electrode comprises the entire Vcom electrode (common electrode(s)).

Figure 3A:
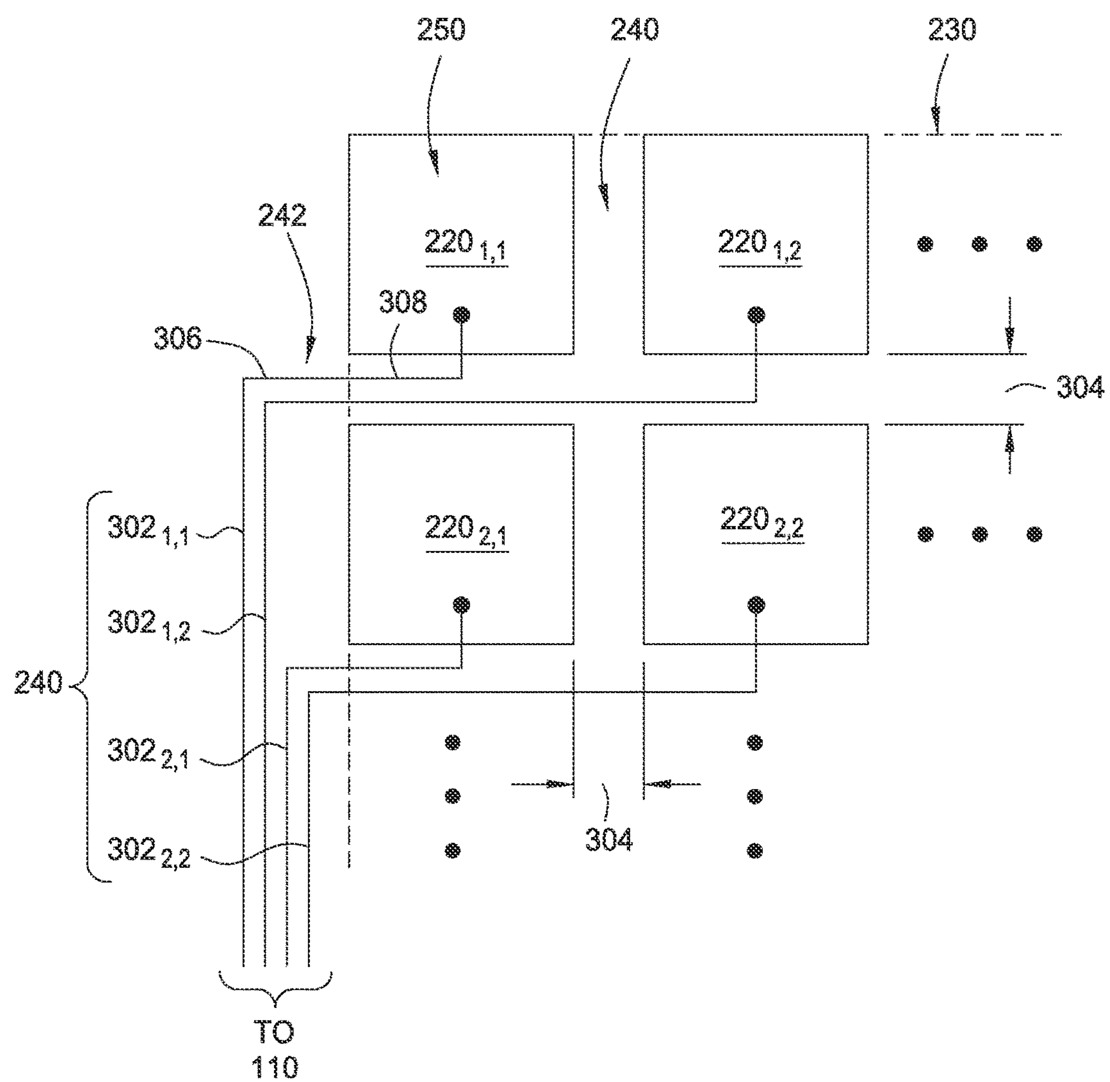
FIG. 3A is a schematic partial plan view of the pattern of sensor electrodes illustrated in FIG. 2 according to one embodiment.

FIG. 3A is a schematic partial plan view of a portion of the matrix 250 of sensor electrodes 220 illustrating the routing traces 240 extending between each of the sensor electrodes 220 and the processing system 110. As discussed above, each routing trace 240 is coupled a respective one of the sensor electrodes 220. For example, in the portion of the matrix 250 shown in FIG. 3A, the routing traces 240 are individually shown as routing traces $\mathbf{302}_{1,1}$, $\mathbf{302}_{1,2}$, $\mathbf{302}_{2,1}$, and $\mathbf{302}_{2,2}$, which respectively coupled a respective one of the sensor electrodes $\mathbf{220}_{1,1}$, $\mathbf{220}_{1,2}$, $\mathbf{220}_{2,1}$, and $\mathbf{220}_{2,2}$ to the processing system 110. A first portion 306 of the routing trace $\mathbf{302}_{1,1}$ is located outward of the areal extent 230 of the sensor electrodes 220. A second portion 308 of the routing trace $\mathbf{302}_{1,1}$ is located within the bounds of the areal extent 230 of the sensor electrodes 220. The second portion 308 of the routing trace $\mathbf{302}_{1,1}$ is routed in a space 304 defined between the sensor electrodes 220. As further described below with reference to FIG. 4, the space 304 is also aligned between the pixels of the display. The other routing traces $\mathbf{302}_{1,2}$, $\mathbf{302}_{2,1}$, and $\mathbf{302}_{2,2}$ also have first and second portions 306, 308, wherein the second portions 308 are similarly routed in the spaces 304. The routing traces $\mathbf{302}_{1,1}$, $\mathbf{302}_{1,2}$, $\mathbf{302}_{2,1}$, and $\mathbf{302}_{2,2}$ may have the same or equal length. In some embodiments, the routing traces $\mathbf{302}_{1,1}$, $\mathbf{302}_{1,2}$, $\mathbf{302}_{2,1}$, and $\mathbf{302}_{2,2}$ may have substantially the same resistance. In some embodiments, the routing traces $302_{1,1}$, $302_{1,2}$, $302_{2,1}$, and $302_{2,2}$ may have substantially the same capacitance.

Figure 3B:
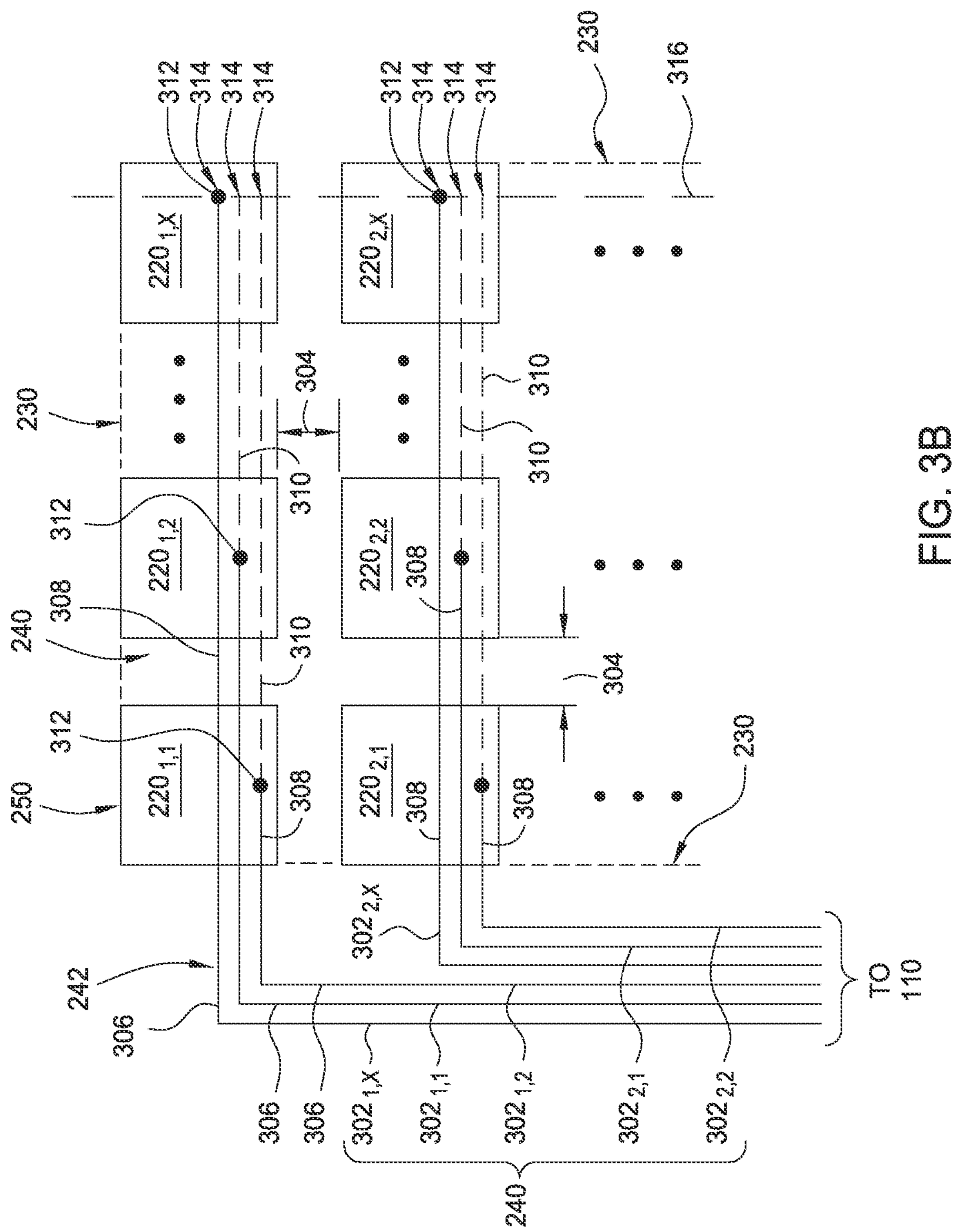
FIG. 3B is a partial schematic of the pattern of sensor electrodes illustrated in FIG. 2 according to another embodiment.

FIG. 3B is a partial schematic of the pattern of sensor electrodes 220 illustrated in FIG. 2 according to another embodiment. In the embodiment of FIG. 3B, traces 240 are routed below the sensor electrodes 220. A first portion 306 of the routing traces 240 is located outward of the areal extent 230 of the sensor electrodes 220. A second portion 308 of the routing trace 240 is located within the bounds of the areal extent 230 of the sensor electrodes 220. The traces 240 are coupled to the sensor electrodes 220 by vias 312. The traces 240 may include an extension portion 310 (shown as a dashed line) which is defined between the via 312 and an end 314 of the trace 240 farthest from the processing system 110. The ends 314 are all the traces 240 may be substantially aligned as shown by dashed line 316 so that all the traces 240 are substantially the same length. The ends 314 may be slightly misaligned to accommodate the additional length of a trace disposed outward of an adjacent trace due to any non-linearity of the path of the routing. For example, as trace $302_{1,X}$ is outward of trace $302_{1,1}$ as the traces 240 fan out from the IC of the processing system 110 shown at the upper left portion of FIG. 3B, the end 312 of trace may be slightly to the left of the end of trace 312 to accommodate the longer routing distance of the outwardly offset trace $302_{1,X}$. Although the traces 240 are shown as having a non-linear layout geometry, the traces 240 may alternatively be routed in a substantially linear layout geometry between the processing system 110 and the sensor electrodes 220. The extensions 310 may be utilized to even out the resistance of the traces 240 so that the trace to trace resistance is similar.

Figure 4:
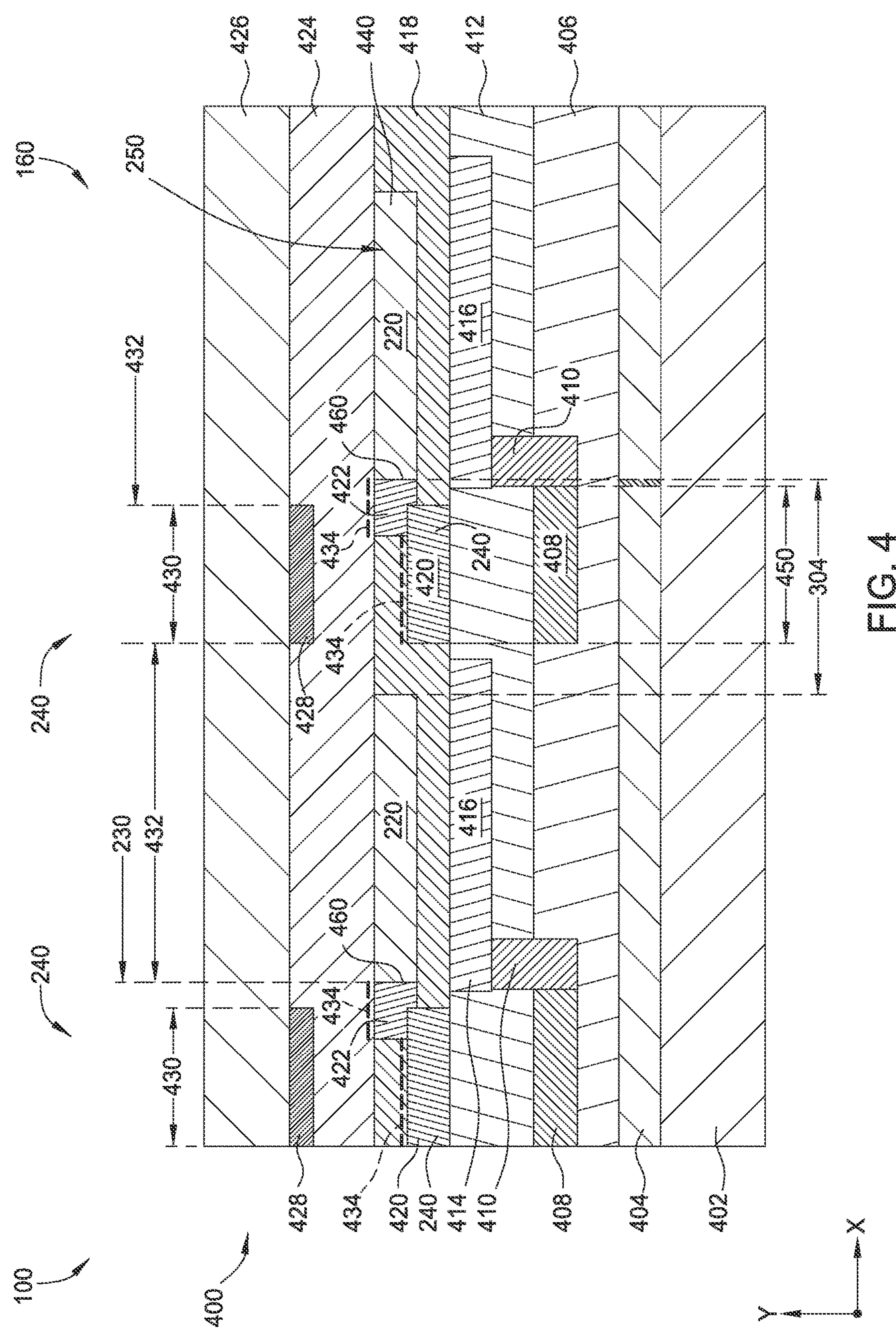
FIG. 4 is a schematic sectional view of a sensing stack including the sensor electrodes illustrated in FIG. 2.

Referring now to the sectional view of the input device 100 depicted in FIG. 4, the sensor electrodes 220 are embedded in a sensing stack 400 of the display device 160. The sensing stack 400 includes a thin film transistor (TFT) substrate 402, a gate metal layer 404, a first insulating layer 406, a data metal layer 408, a second insulating layer 412, a pixel layer 414, a third insulating layer 418, a metal interconnect layer 420, a conductive sensing layer 440, a display layer 424 and a color filter glass layer 426. The layers and substrates of the sensing stack 400 may be secured together in any suitable manner, for example, using optically clear adhesives.

The TFT substrate 402 may be a glass, plastic or other suitable substrate. A plurality of transistors (not shown) are disposed on the TFT substrate 402 to control the images produced by the display device 160.

The gate metal layer 404 is disposed on the TFT substrate 402. The gate metal layer 404 includes source and control traces for providing output and controlling the operations of the transistors disposed on the TFT substrate 402.

The first insulating layer 406 is disposed on the gate metal layer 404. The data metal layer 408 is disposed on the first insulating layer 406. The data metal layer 408 includes a plurality of traces which are coupled to pixels 416 formed in the pixel layer 414. The first insulating layer 406 provides electrical insulation between the gate metal layer 404 and the data metal layer 408.

The second insulating layer 412 is disposed on the data metal layer 408 and the first insulating layer 406. The pixel layer 414 and the metal interconnect layer 420 are disposed on the second insulating layer 412. The second insulating layer 412 provides electrical insulation between the data metal layer 408 and the pixel layer 414.

The routing traces 240 are formed in the metal interconnect layer 420. In some embodiments, the routing traces 240 may be fabricated from metal material such as aluminum, silver, copper or other suitable conductor having a resistivity substantially lower than the resistivity utilized for fabricating the conductive sensing layer 440. Although the routing traces 240 are shown in FIG. 4 separated by a single pixel electrode 416, the routing traces 240 may be separated by a plurality of pixel electrodes 416.

The third insulating layer 418 is disposed on the pixel layer 414 and the second insulating layer 412. The conductive sensing layer 440 and the display layer 424 are disposed on the third insulating layer 418. The third insulating layer 418 provides electrical insulation between metal interconnect layer 420 and the pixel layer 414.

The display layer 424 may be part of a light emitting diode (LED), organic LED (OLED), cathode ray tube (CRT), liquid crystal display (LCD), plasma, electroluminescence (EL), or other display technology. In one embodiment, the display layer 424 is comprised of a liquid crystal material. The transistors disposed on the TFT substrate 402 drives the pixels electrodes 416, causing the display layer 424 to react in a predetermined manner that generates an image produced by the display device 160.

The sensor electrodes 220 are fabricated from the conductive sensing layer 440. The conductive sensing layer 440 is generally parallel to and spaced apart from the pixel layer 414. In some embodiments, the conductive sensing layer 440 may be fabricated from a transparent conductive material such as indium tin oxide (ITO). Such transparent conductive material utilized to fabricate the conductive sensing layer 440, and hence the sensor electrodes 220, generally has a resistivity that is substantially higher than the resistivity of a metal conductor utilized to fabricate the metal interconnect layer 420. For example, ITO has an electrical resistivity of $5\times10^{-4}$ Ωcm while copper, which can be used as the metal interconnect layer 420, has an electrical resistivity of $1.68\times10^{-10}$ Ωcm.

The color filter glass layer 426 is disposed on the display layer 424. A cover lens and one or more polarizers (not shown) may be disposed above the color filter glass layer 426. The cover lens may be formed from a glass, plastic, or polymer material. The cover lens above the color filter glass layer 426 includes a touch surface defined on the exterior of the sensing stack 400 for interacting with one or more input objects 140. In one embodiment, the touch surface establishes the sensing region 120 for the input device 100 shown in FIG. 1. In one example, the cover lens may be an outer surface of the input device 100 (e.g., a touch interface) and/or be an outer surface of the display device 160 (e.g., a touch screen interface).

The sensor electrodes 220 are generally aligned with the pixel electrodes 416. In the embodiment of FIG. 4, each sensor electrode 220 is stacked above at least one of the pixel electrodes 416 in a direction perpendicular to the plane of the sensor electrodes 220. For example, each sensor electrode 220 may be stacked above at least one of the pixel electrodes 416 in the Y direction which is perpendicular to the X-Z plane defined by the sensor electrodes 220. As such, the pixel electrodes 416 reside completely or at least essentially within the areal extent 230 defined by the sensor electrodes 220. The alignment between the sensor electrodes 220 and the pixel electrodes 416 is such that a space 450 defined between adjacent pixel electrodes 416 is overlaps in substantial alignment the space 304 defined between adjacent sensor electrodes 220. For example, the space 304 may be aligned directly above the space 450 in the Y direction.

The portion of the routing traces 240 shown in FIG. 4 corresponds to the second portion 308 of the routing traces 240 shown in FIG. 3A. In certain embodiments, the routing traces 240 are generally positioned between the layers 440, 414. The routing traces 240 defined in the metal interconnect layer 420 are thus positioned in the spaces 304, 450 defined between the sensor and pixel electrodes 220, 416. The second portion 308 of the routing traces 240 disposed in a position located within the boundary of the spaces 304, 450 may be masked to reduce visibility. For example, one or more areas of black mask material 428 may be disposed between the color filter glass layer 426 (or cover lens) and the display layer 424 to visually shield the metal interconnect layer 420 from view through the color filter glass layer 426. In some alternative embodiments, a non-reflective coating 434 may be disposed between the color filter glass layer 426 (or cover lens) and the display layer 424 to visually shield the metal interconnect layer 420. The non-reflective coating 434 may be an oxide disposed on the color filter glass side surface of the metal interconnect layer 420. Thus, the areal extent 230 of the sensor electrodes 220 may be divided into masked regions 430 in which the second portion 308 of the routing traces 240 resides, and unmasked regions 432 that are generally above the sensor and pixel electrodes 220, 416.

The routing traces 240 formed in the metal interconnect layer 420 are coupled to the sensor electrodes 220 by a connection 460. The connection 460 may be defined by either by a conductive via 422 extending between one or more intervening layers, such as the third insulating layer 418 as illustrated in FIG. 4; or direct contact between the routing traces 240 formed in the metal interconnect layer 420 and the sensor electrodes 220 when formed in adjacent layers as shown in the sensing stack 500 illustrated in FIG. 5.

Continuing to refer to FIG. 4, the conductive vias 422, when present in certain embodiments, may be fabricated from a metal or conductive transparent oxide. The use of metals for the conductive vias 422 will contribute to better input device performance. In one embodiment, the conductive vias 422 are also disposed in a position located within the boundary of the spaces 304, 450 (i.e., within the masked regions 430) and may be masked to reduce visibility as described above with reference to the metal interconnect layer 420. By having the conductive vias 422 positioned in at least partially or fully in the masked regions (or coated with the non-reflective coating 434), visibility of the conductive vias 422 through the color filter glass layer 426 is beneficially reduced. In other embodiments, the conductive vias 422 may be positioned in at least partially or fully below the sensor electrodes 220. By having the conductive vias 422 positioned in at least partially or fully below the sensor electrodes 220, visibility of the conductive vias 422 through the color filter glass layer 426 is beneficially reduced.

The beneficial visibility reducing position of at least the routing traces 240, and optionally also the vias 422, allow metals to be utilized as the signal conductor between the sensor electrodes 220 and processing system 110, thereby enhancing settling and response times without creating undesirable visual effects as compared to input devices that rely on ITO traces between sensor electrodes and processing systems.

Similarly, the data lines formed in the data metal layer 408 may be positioned below (i.e., in the Y direction away from the color filter glass layer 426) the routing traces routing traces 240 to reduce visual effects. For example, the data lines formed in the data metal layer 408 and coupled to the pixel electrode 416 may also be positioned in the spaces 304, 450 defined between the sensor and pixel electrodes 220, 416 (i.e., in the masked regions 430) to visually shield the data metal layer 408 from view through the color filter glass layer 426.

The data lines formed in the data metal layer 408 are coupled to the pixel electrodes 416 by a connection (not identified by reference numeral in FIG. 4). The connection may be defined by either direct contact between the data lines formed in the data metal layer 408 and the pixel electrodes 416 when formed in adjacent layers, or by a conductive via 410 extending between one or more intervening layers, such as the second insulating layer 412.

The conductive vias 410, when present in certain embodiments, may be fabricated from a metal or conductive transparent oxide. In one embodiment, the conductive vias 410 are also positioned in the spaces 304, 450 (i.e., within the masked regions 430) and may be masked to reduce visibility as described above with reference to the metal interconnect layer 420. By having the conductive vias 410 positioned in at least partially or fully in the masked regions, visibility of the conductive vias 410 through the color filter glass layer 426 is beneficially reduced. In other embodiments, the conductive vias 410 may be positioned in at least partially or fully below the pixel electrodes 416. By having the conductive vias 410 positioned in at least partially or fully below the pixel electrodes 416, visibility of the conductive vias 410 through the color filter glass layer 426 is beneficially reduced.

The beneficial visibility reducing position of at least the data lines formed in the data metal layer 408, and optionally also the vias 410, allow metals to be utilized as the signal conductor between the pixel electrodes 416 and processing system 110, thereby enhancing display device performance without creating undesirable visual effects as compared to input devices that rely on ITO traces between pixel electrodes and processing systems.

Figure 5:
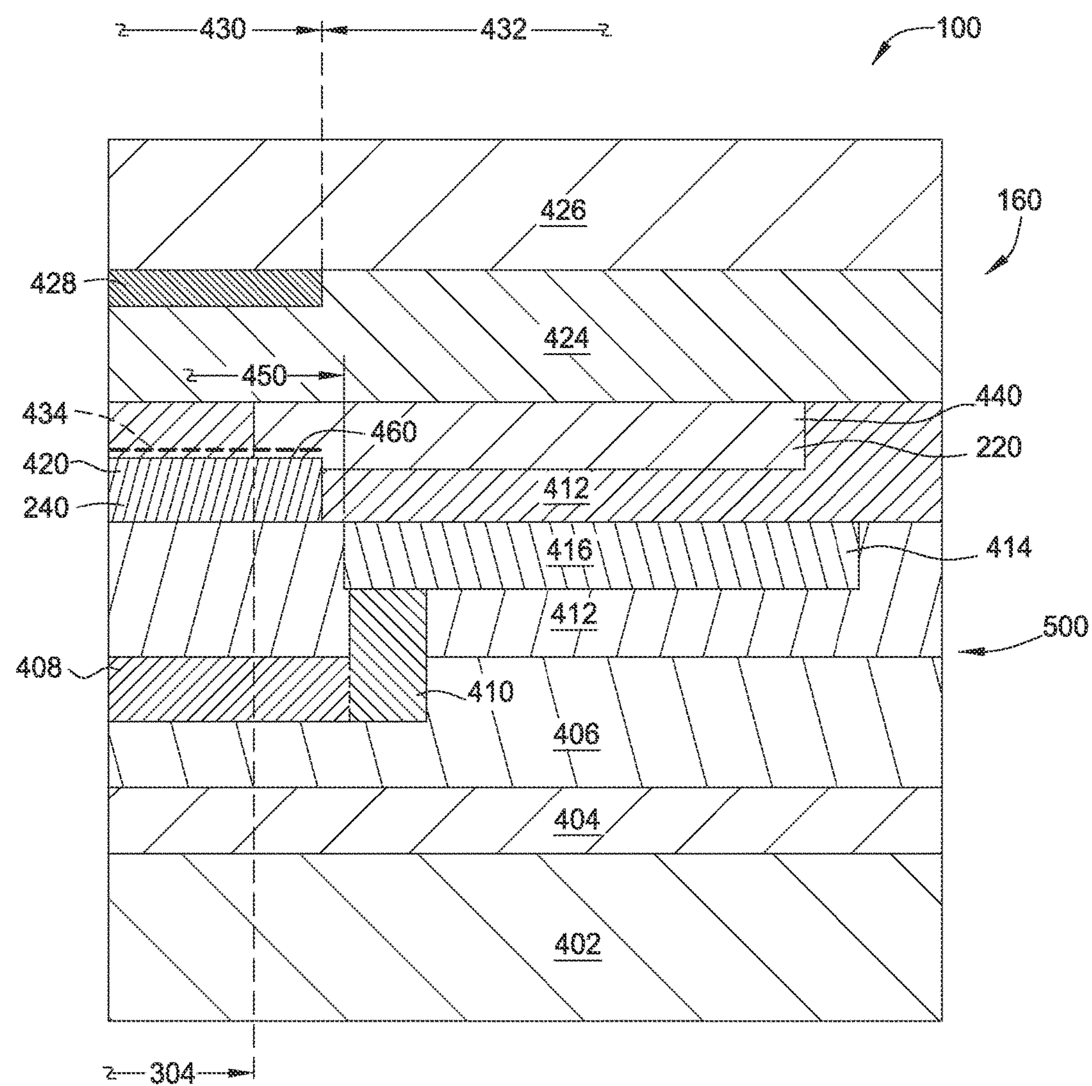
FIG. 5 is a schematic sectional view of another sensing stack that may be utilized in an input device.

FIG. 5 depicts a sectional view of another embodiment of a sensing stack 500 that may be utilized in the input and display devices 100, 160 such as described above. The sensing stack 500 is similarly arranged as described with reference to the sensing stack 400 illustrated in FIG. 4, except wherein the metal interconnect layer 420 is disposed below the black mask material 428 to facilitate a direct connection 460 between the surfaces of the sensor electrode 220 and the traces 40 of the metal interconnect layer 420. Thus, in this embodiment, the masked region 430 overlaps both the sensor electrode 220 and traces 240 of the metal interconnect layer 420, thereby allowing metal to be utilized for the traces 240 without creating undesirable visual effects.

Accordingly, a connection 460 may be directly established between sensor electrode 220 and traces 240 without use of a via. The direct connection 460 allows the sensing stack 500 to be fabricated with one less masking step compared to the sensing stack 400 described above.

Figure 6:
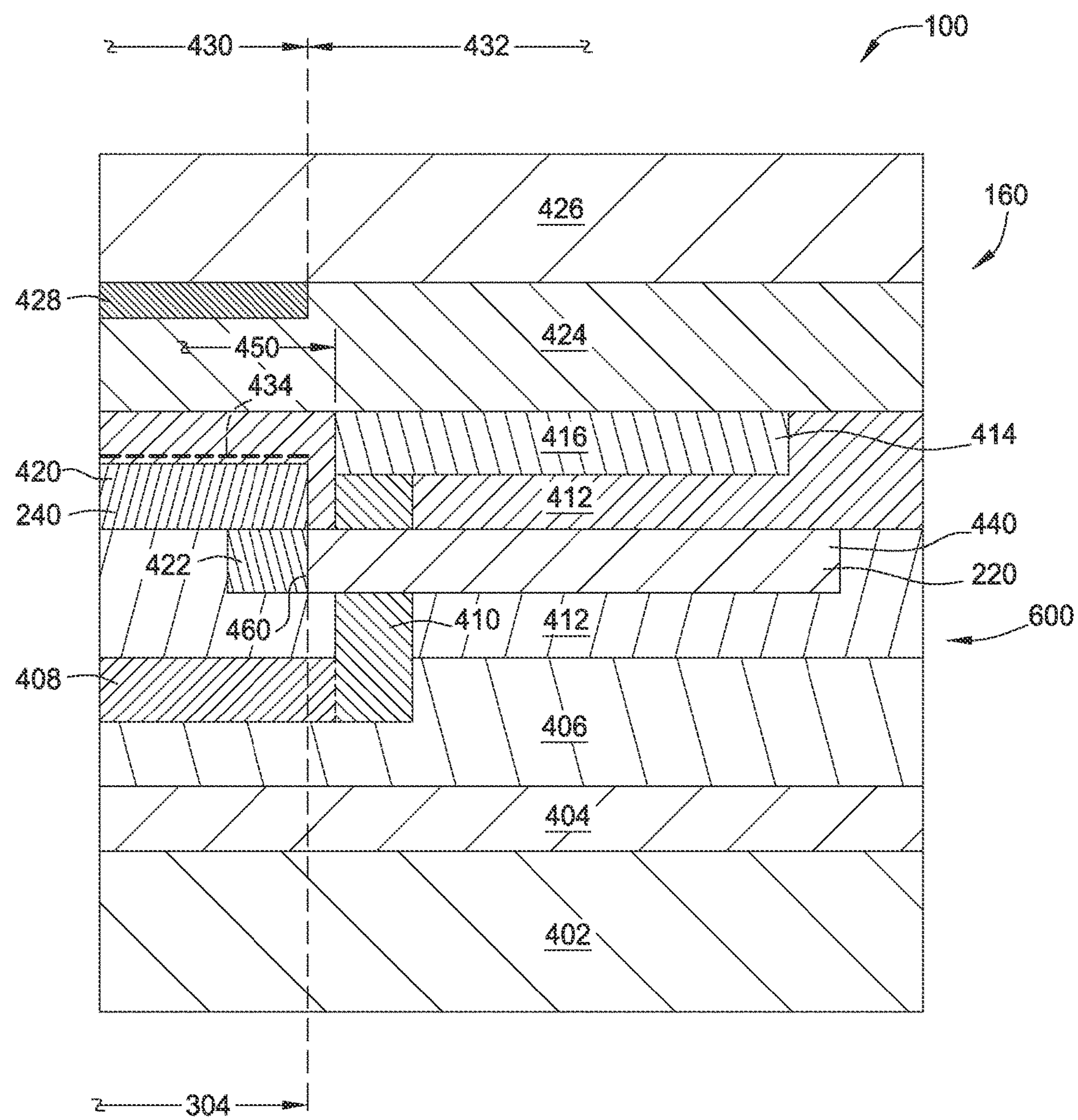
FIG. 6 is a schematic sectional view of another sensing stack that may be utilized in an input device.

FIG. 6 depicts a sectional view of another embodiment of a sensing stack 600 that may be utilized in the input and display devices 100, 160 such as described above. The sensing stack 600 is similarly arranged as described with reference to the sensing stack 400 illustrated in FIG. 4, except wherein the pixel layer 414 is disposed closer to the color filter glass layer 426 relative to the conductive sensing layer 440. To accommodate the switched positions of the pixel and color filter glass layers 414, 426, the via 422 providing the connection between the sensor electrodes 220 and traces 240 is below the metal interconnect layer 420 and within the second insulating layer 412, thereby allowing the metal interconnect layer 420 to further shield the via 422 from view. Beneficially, if a non-reflective coating 434 is optionally utilized on the metal interconnect layer 420 without use of the black mask material 428, the via 422 will not require a separate non-reflective coating 434 due to the shielding by of the via 422 by the metal interconnect layer 420. Similarly, the via 410 extends through the second and third insulating layers 412, 418 and the conductive sensing layer 440 to provide connection to the pixel electrode 416 residing on top of the sensor electrode 220. Although the via 410 appears to contact the conductive sensing layer 440 in FIG. 4, the via 410 actually passes through the conductive sensing layer 440 without making electrical connection with any of the sensor electrodes 220 while being routed to the pixel electrode 416.

Figure 7:
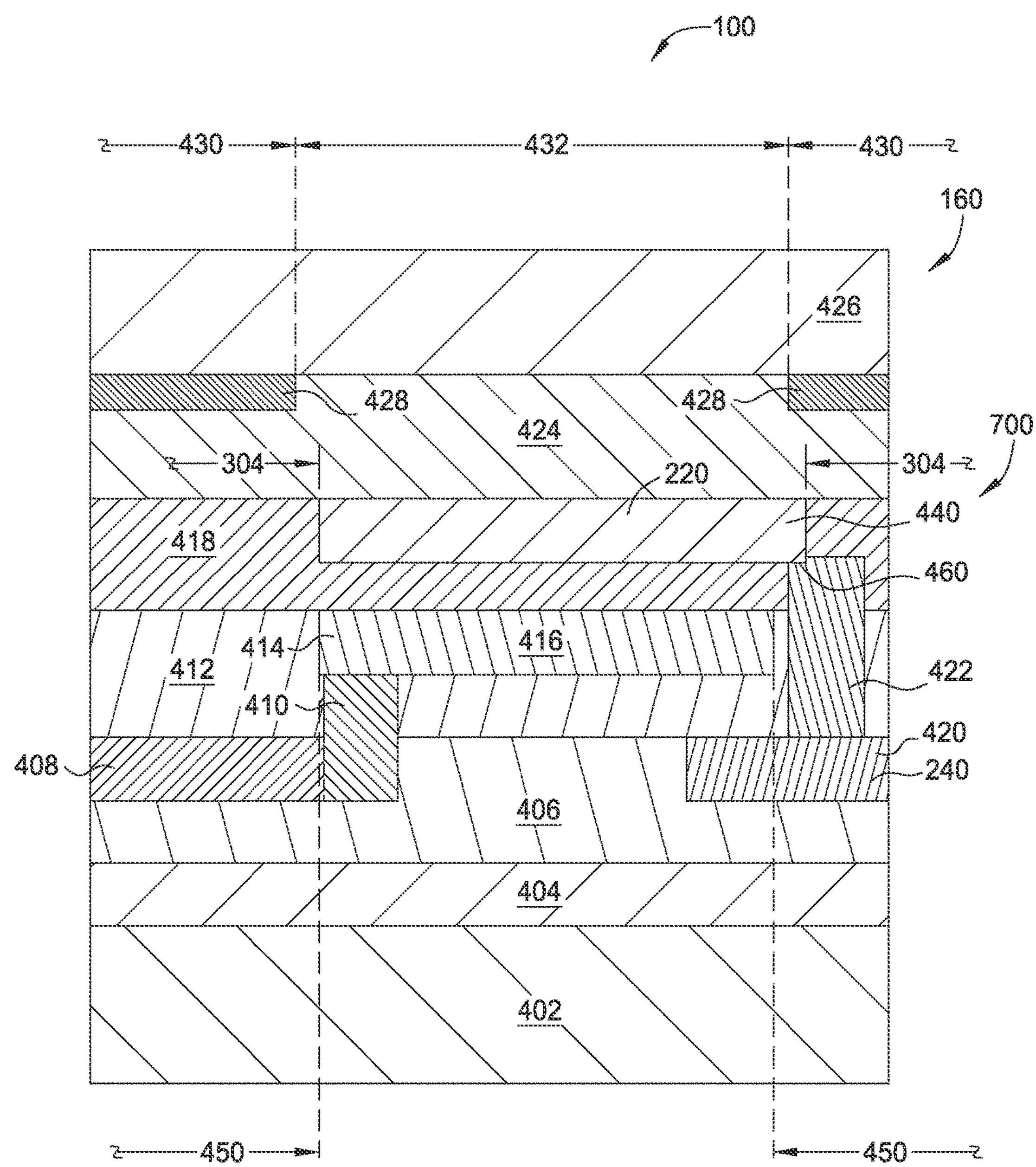
FIG. 7 is a schematic sectional view of another sensing stack that may be utilized in an input device.

FIG. 7 depicts a sectional view of another embodiment of a sensing stack 700 that may be utilized in the input and display devices 100, 160 such as described above. The sensing stack 700 is similarly arranged as described with reference to the sensing stack 400 illustrated in FIG. 4, except wherein the metal interconnect layer 420 is disposed closer to the TFT substrate 402 relative to the pixel layer 416.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A capacitive sensing device comprising:

a conductive sensor layer having a plurality of sensor electrodes, each of the sensor electrodes comprising one or more common electrodes of a display device configured for display updating and capacitive sensing, the plurality of sensor electrodes having an areal extent defined in a plane of the conductive sensor layer in which an active area of the sensor electrodes is configured to detect input events, the plurality of sensor electrodes arranged in a matrix having columns and rows in a single plane, each row having at least two sensor electrodes of the plurality of sensor electrodes and each column having at least two sensor electrodes of the plurality of sensor electrodes;

a metal interconnect layer disposed in the active area and stacked with the conductive sensor layer, the metal interconnect layer comprising routing traces, each routing trace of the routing traces is respectively coupled to a unique one of the plurality of sensor electrodes through a via forming a plurality of unique routing trace and sensor electrode pairings, the routing traces extending from within a first region defined by the areal extent of the plurality of sensor electrodes of the matrix to a second region outward of the areal extent of the plurality of sensor electrodes of the matrix, each of the plurality of unique routing trace and sensor electrode pairings are independently addressable;

a pixel layer stacked with the conductive sensor layer and the metal interconnect layer, the pixel layer comprising pixel electrodes, the pixel electrodes spaced apart from and aligned with the sensor electrodes of the matrix;

masked regions in which the first region of the sensor electrodes of the matrix resides, the masked regions covering the routing traces of the metal interconnect layer, each of the vias, and a portion of each of the plurality of sensor electrodes; and a display layer comprising a liquid crystal material disposed above the conductive sensor layer, the metal interconnect layer, the vias, and the pixel layer.

2. The capacitive sensing device of claim 1 further comprising:

a black mask layer stacked with the pixel layer, the conductive sensor layer and the metal interconnect layer, the black mask layer forming the masked regions, the masked regions disposed between adjacent pixel electrodes and adjacent sensor electrodes arranged in the matrix, the sensor electrodes and the pixel electrodes aligned such that a space between the adjacent pixel electrodes overlaps a space between the adjacent sensor electrodes.

3. The capacitive sensing device of claim 1, wherein each of the routing traces has about the same length, and substantially the same resistance or capacitance.

4. The capacitive sensing device of claim 1 further comprising:

a data metal layer stacked with the pixel layer, the conductive sensor layer and the metal interconnect layer, the data metal layer comprising a plurality of source lines disposed in the first region defined by the areal extent of the plurality of sensor electrodes of the matrix, the source lines disposed in a position stacked above or below the routing traces, the source lines covered by the masked regions.

5. The capacitive sensing device of claim 1 further comprising:

a processing system coupled to the plurality of sensor electrodes via the routing traces, the processing system is configured to drive sensing signals onto the routing traces for performing capacitive sensing.

6. A capacitive sensing device comprising:

a display device comprising:

a sensing stack, wherein a plurality of sensor electrodes and a plurality of pixel electrodes are arranged in a matrix, the sensing stack comprising:

a conductive sensor layer having the plurality of sensor electrodes arranged in the matrix comprising at least two rows and at least two columns, each row having at least two sensor electrodes of the plurality of sensor electrodes and each column having at least two sensor electrodes of the plurality of sensor electrodes, each of the sensor electrodes comprising one or more common electrodes of a display device configured for display updating and capacitive sensing, the plurality of sensor electrodes having an areal extent defined in a plane of the conductive sensor layer in which an active area of the sensor electrodes is configured to detect input events;

a metal interconnect layer fabricated from a material having a resistivity lower than a material comprising the conductive sensor layer, the metal interconnect layer comprising routing traces, each routing trace of the routing traces is respectively coupled to a unique one of the plurality of sensor electrodes through a via forming a plurality of unique routing trace and sensor electrode pairings, the routing traces extending from within a first region of the sensing stack defined by the areal extent of the plurality of sensor electrodes of the matrix to a second region of the sensing stack defined outward of the areal extent of the plurality of sensor electrodes of the matrix, each of the plurality of unique routing trace and sensor electrode pairings are independently addressable;

a pixel layer comprising the plurality of pixel electrodes, the pixel electrodes spaced apart from and aligned with the sensor electrodes of the matrix; and a masked region in which the first region of the sensor electrodes of the matrix resides, the masked region covering the routing traces of the metal interconnect layer, each of the vias, and a portion of each of the plurality of sensor electrodes; and a display layer having a liquid crystal material disposed above the conductive sensor layer, the metal interconnect layer, the vias, and the pixel layer.

7. The capacitive sensing device of claim 6, wherein the sensing stack further comprises:

a black mask layer having the masked region disposed between adjacent pixel electrodes and adjacent sensor electrodes arranged in the matrix, the sensor electrodes and the pixel electrodes aligned such that a space between the adjacent pixel electrodes overlaps a space between the adjacent sensor electrodes.

8. The capacitive sensing device of claim 6, wherein each of the routing traces has about the same length, and substantially the same resistance or capacitance.

9. The capacitive sensing device of claim 6, wherein adjacent pixel electrodes have at least one or more routing traces disposed therebetween.

10. The capacitive sensing device of claim 6, wherein the sensing stack further comprises:

a data metal layer comprising a plurality of source lines disposed in the first region defined by the areal extent of the plurality of sensor electrodes of the matrix, the source lines stacked above or below the routing traces, the source lines covered by the masked region.

11. The capacitive sensing device of claim 6 further comprising:

an anti-reflective oxide layer forming the masked region and disposed on the routing traces.

12. The capacitive sensing device of claim 1, wherein the conductive sensor layer is disposed between the display layer and the metal interconnect layer, the metal interconnect layer is disposed between the conductive sensor layer and the pixel layer.

13. The capacitive sensing device of claim 1, wherein the pixel layer is disposed between the display layer and the metal interconnect layer, the metal interconnect layer is disposed between the conductive sensor layer and the pixel layer.

14. The capacitive sensing device of claim 1, wherein the conductive sensor layer is disposed between the display layer and the pixel layer, the pixel layer is disposed between the conductive sensor layer and the metal interconnect layer.

15. The capacitive sensing device of claim 1, where each of the plurality of sensor electrodes comprises a similar size and shape.

16. The capacitive sensing device of claim 1, wherein the vias are formed in the portions of each of the plurality of sensor electrodes covered by the masked regions.

17. The capacitive sensing device of claim 6, where each of the plurality of sensor electrodes comprises a similar size and shape.

18. The capacitive sensing device of claim 6, wherein the conductive sensor layer is disposed between the display layer and the pixel layer, the pixel layer is disposed between the conductive sensor layer and the metal interconnect layer.

19. The capacitive sensing device of claim 6, wherein the conductive sensor layer is disposed between the display layer and the metal interconnect layer, the metal interconnect layer is disposed between the conductive sensor layer and the pixel layer.

20. The capacitive sensing device of claim 6, wherein the pixel layer is disposed between the display layer and the metal interconnect layer, the metal interconnect layer is disposed between the conductive sensor layer and the pixel layer.

* * * * *